US005635265A

United States Patent [19]

Potokar

[11] Patent Number: 5,635,265

[45] Date of Patent: Jun. 3, 1997

[54] APPARATUS FOR DECORATIVE MOUNTING OF PLANAR ARTICLES

[76] Inventor: Steven J. Potokar, 11 Pheasant Run, Hawthorn Wds., Ill. 60047

[21] Appl. No.: 585,897

[22] Filed: Jan. 16, 1996

[51] Int. Cl.$^6$ .................... B32B 9/00

[52] U.S. Cl. .................... 428/43; 428/14; 428/33; 428/42.2; 428/81; 428/194; 428/203; 428/343; 428/375; 428/904.4; 428/41

[58] Field of Search .................... 428/14, 43, 194, 428/202, 421, 261, 375, 288, 357, 246, 41, 203, 81, 343, 904.4, 33; 40/152.1, 152, 157

[56] References Cited

U.S. PATENT DOCUMENTS 3,736,684 6/1973 Grad .................... 40/152
3,900,684 8/1975 Edwards et al. .................... 428/421
3,987,569 10/1976 Chase .................... 40/158 R
4,358,500 11/1982 George et al. .................... 428/246
4,624,875 11/1986 Watanabe et al. .................... 428/41
4,764,632 8/1988 Cohen .................... 556/27

*Primary Examiner*—Patrick Ryan
*Assistant Examiner*—Abraham Bahta
*Attorney, Agent, or Firm*—Douglas B. White

[57] ABSTRACT

An adhesive mounting apparatus is described which employs a mounting board, an overlying plastic film and an adhesive layer on the mounting board mixed with aluminum chlorohydrate. Articles placed against the adhesive layer are secured by the adhesive and covered by the thick transparent film to create the appearance of a glass covering. A tab along the free edge of the film assists in the lifting of the film during replacement or rearrangement of the mounted articles.

12 Claims, 3 Drawing Sheets

APPARATUS FOR DECORATIVE MOUNTING OF PLANAR ARTICLES

BACKGROUND OF THE INVENTION

1. Field of the Invention

The apparatus of the present invention is directed generally to decorative framing and mounting boards for displaying planar articles such as pictures or cards. More particularly this invention is directed toward apparatus for convenient, temporary mounting of such articles, which allows for easy replacement.

2. Description of the Prior Art

Adhesive attachment of articles to a mounting board under an overlying plastic film has been known (see for example U.S. Pat. No. 4,777,746; U.S. Pat. No. 4,057,923; and U.S. Pat. No. 3,893,252). However, such prior apparatus has not achieved a glass-like appearance nor presented means for facilitating the repeated replacement of the article displayed. Additionally, such prior systems have characteristically provided high adhesion to the overlying plastic film while providing low adhesion to the card or picture being mounted. Consequently, the repeated lifting of the film has had a tendency to delaminate the mounting board and, unless the mounting board is lying flat, the article being mounted has had a tendency to slide out of position or fall off the mounting board, making it difficult to change a display on a wall hung unit.

SUMMARY OF THE INVENTION

The present invention overcomes the aforementioned difficulties and yields an adhesive mounting apparatus which securely holds planar objects yet does not delaminate the cardboard backing member when the film is lifted. Particularly, a unique adhesive layer is provided on a cardboard backing member, and a thick transparent film overlying the adhesive is secured along one edge thereof. A tab along a free edge of the film assists in the lifting of the film during replacement or rearrangement of the articles mounted thereunder. A film thickness of 0.007 inches or greater provides a glass-like appearance and facilitates the separation of the film from the backing. Additionally, by mixing aluminum chlorohydrate with pressure sensitive mounting adhesive, the adhesion to the mounted cards is increased while the adhesion to the film is decreased sufficiently to prevent delamination of the cardboard backing member.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
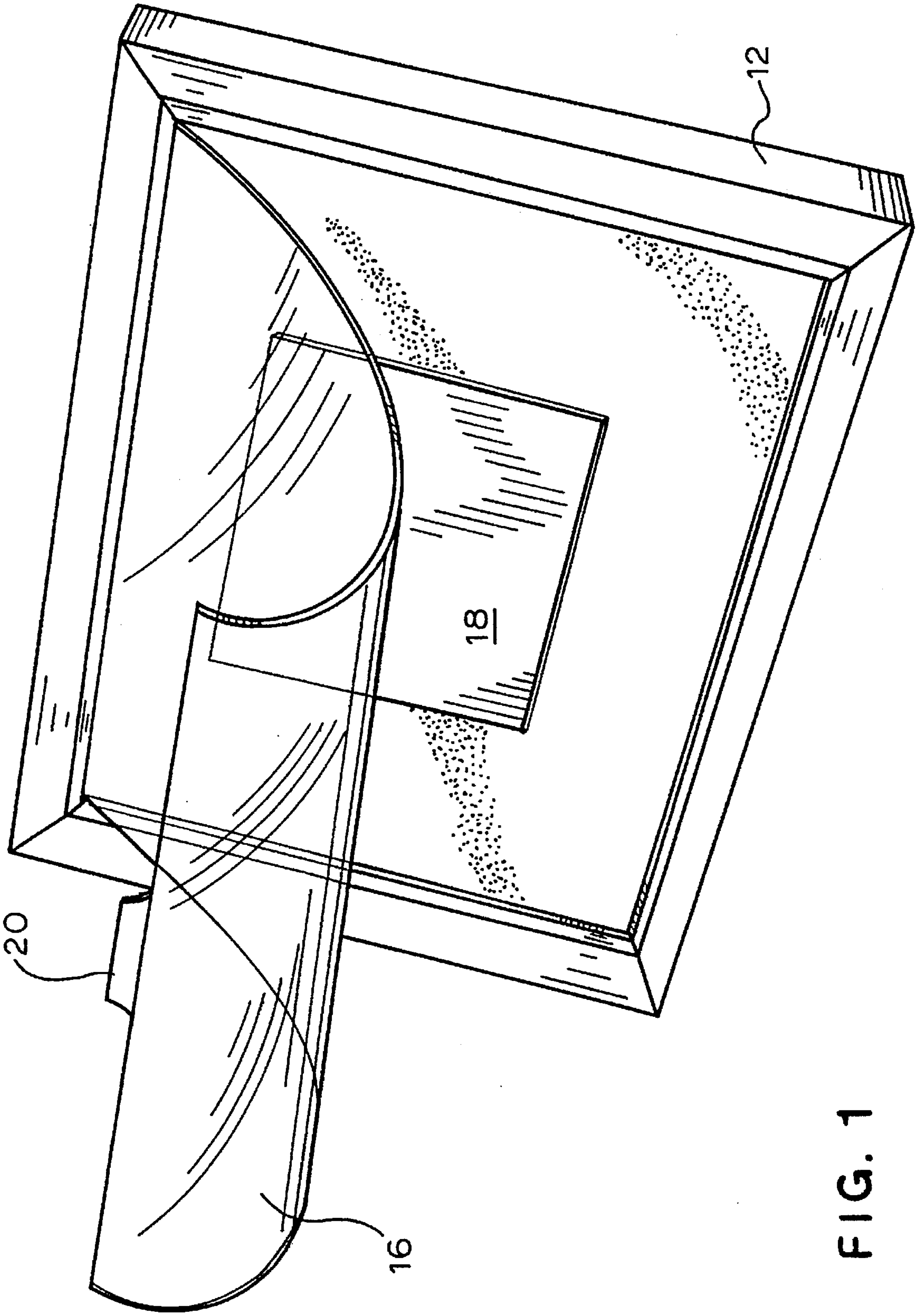
FIG. 1 is a perspective view of the mounting apparatus of the present invention showing the film lifted to expose a mounted picture.
Figure 2:
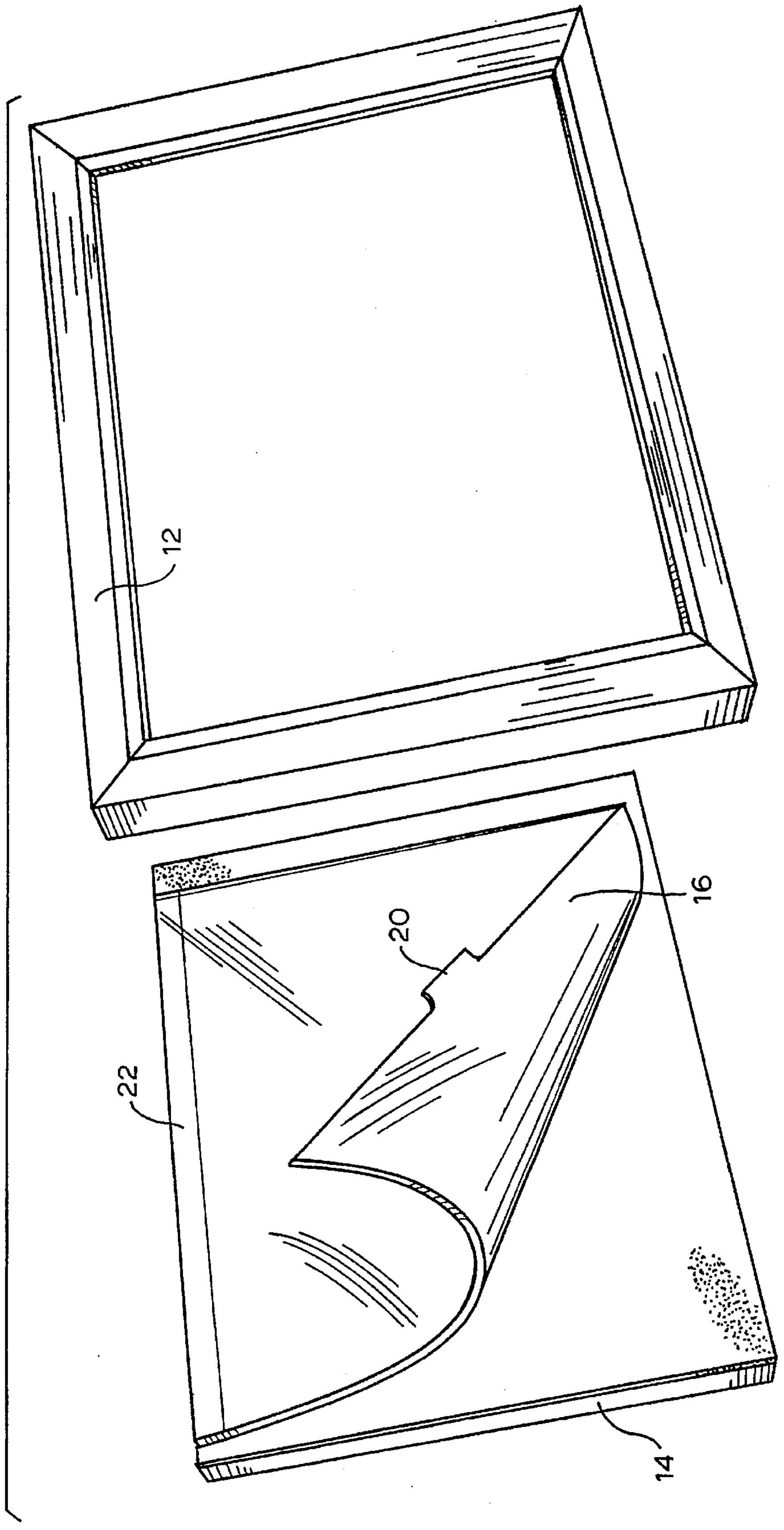
FIG. 2 is an exploded view of the apparatus of FIG. 1 showing the backing member separated from the frame.
Figure 3:
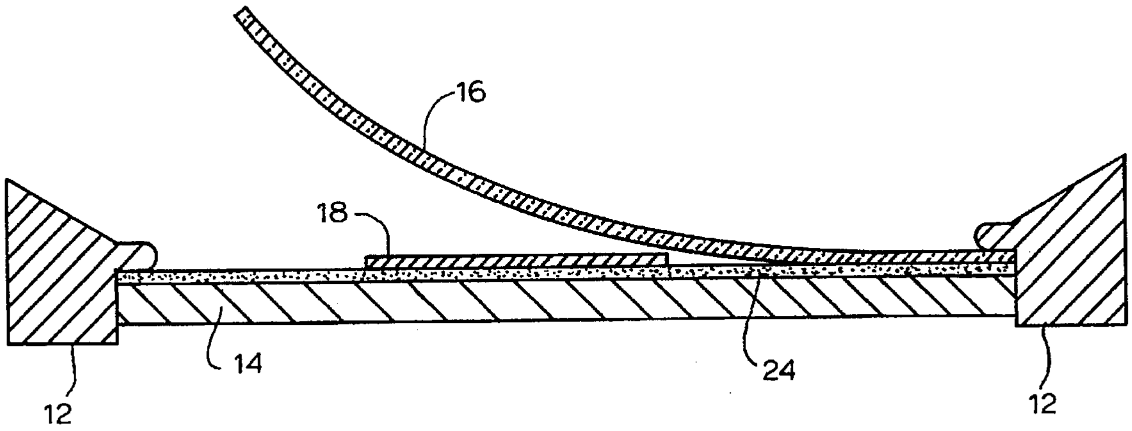
FIG. 3 is a cross section of the apparatus of FIG. 1.

Turning first to FIG. 1 there is shown a perspective view of an apparatus for decorative mounting of planar articles in accordance with the present invention. A frame 12 supports an adhesive coated mounting board 14 and a flexible, transparent, overlying plastic film 16. Planar articles, such as a picture or card 18, are adhered to the mounting board by means of the adhesive layer and covered by the transparent plastic film. When the card 18 is to be rearranged or replaced, the transparent film is lifted by peeling it from the adhesive mounting board. To facilitate this lifting of the film, a tab or lip 20 is provided along the free edge of the film, while the opposite edge is secured along a portion of the periphery of the mounting board. In the preferred embodiment, the film is sized to clear the frame on three of its four sides to allow front access without removal of the mounting board.

In order to achieve a smooth glass-like appearance with the plastic film covering over the mounted articles, it has been experimentally determined that the film thickness needs to be at least 0.007 inches, and in order to prevent delamination of the cardboard backing member, the adhesive force between the adhesive layer and this thick film should be 2.0 oz. per square inch or less. However, in order to adequately hold articles, such as cards, the adhesive to paper adhesion strength needs to be 1.6 oz. per square inch or greater. These adhesive requirements cannot be met with generally available pressure sensitive adhesives currently on the market; however, by mixing aluminum chlorohydrate with available pressure sensitive mounting adhesives, the requisite adhesive properties result.

From the foregoing description, it will be apparent that modifications can be made to the apparatus and method for using same without departing from the teachings of the present invention. Accordingly, the scope of the invention is only to be limited as necessitated by the accompanying claims.

I claim:

1. Apparatus for decorative mounting of planar articles comprising:

a planar backing member;

an adhesive layer superimposed on said backing member, wherein said adhesive layer comprises a pressure sensitive adhesive mixed with aluminum chlorohydrate; and a transparent plastic film attached to said backing member along a portion of its periphery and superimposed over said adhesive layer.

2. The apparatus for decorative mounting of planar articles of claim 1 wherein said backing member is rectangular in shape and said film is attached along one edge thereof.

3. The apparatus for decorative mounting of planar articles of claim 2 further comprising tab means affixed to said film to facilitate the separation of said film from said backing member.

4. The apparatus for decorative mounting of planar articles of claim 1 wherein said film thickness is 0.007 inches or greater.

5. The apparatus for decorative mounting of planar articles of claim 3 wherein said film thickness is 0.007 inches or greater.

6. The apparatus for decorative mounting of planar articles of claim 4 wherein said adhesive layer exerts an adhesive force of 2.0 oz. per square inch or less to said film and 1.6 oz. per square inch or greater to said planar article.

7. The apparatus for decorative mounting of planar articles of claim 5 wherein said adhesive layer exerts an adhesive force of 2.0 oz. per square inch or less to said film and 1.6 oz. per square inch or greater to said planar article.

8. Apparatus for decorative mounting of planar articles comprising:

a decorative frame member;

a planar backing member mounted to said frame member and defining a display area;

an adhesive layer superimposed on said backing member, wherein said adhesive layer comprises a pressure sensitive adhesive mixed with aluminum chlorohydrate; and a transparent plastic film attached to said backing member along a portion of its periphery and superimposed over said adhesive layer, wherein the free edges of said film are disposed within said display area.

9. The apparatus for decorative mounting of planar articles of claim 8 wherein said backing member is rectangular in shape and said film is attached along one edge thereof.

10. The apparatus for decorative mounting of planar articles of claim 9 further comprising tab means affixed to said film to facilitate the separation of said film from said backing member.

11. The apparatus for decorative mounting of planar articles of claim 10 wherein said film thickness is 0.007 inches or greater.

12. The apparatus for decorative mounting of planar articles of claim 11 wherein said adhesive layer exerts an adhesive force of 2.0 oz. per square inch or less to said film and 1.6 oz. per square inch or greater to said planar article.

* * * * *